May 23, 1950  L. S. BLUTH ET AL  2,509,081
RETAINING RING ASSEMBLY
Filed Jan. 25, 1945

Inventors
Ludwig S. Bluth,
Rudolf Feitl,
By J. Harold Kilcoyne
Attorney

Patented May 23, 1950

2,509,081

UNITED STATES PATENT OFFICE 2,509,081

RETAINING RING ASSEMBLY

Ludwig S. Bluth, Hollywood, Calif., and Rudolf Feitl, Brooklyn, N. Y., assignors to Waldes Koh-I-Noor, Inc., Long Island City, N. Y., a corporation of New York Application January 25, 1945, Serial No. 574,580

6 Claims. (Cl. 85—8.5)

This invention relates to improvements in retaining ring assemblies for securing machine parts, for example gears, bearing races, pulleys, and the like, against axial displacement on shafts or in housings and to an improved spring retaining ring for use therewith.

Ordinary retaining rings of uniform section height and equal thickness throughout are characterized by an inner diameter in the case of an external ring and an outer diameter in the case of an internal ring which equals the diameter of the bottom of the shaft or housing groove into which such rings are conventionally sprung, thus to insure that the ring seats against the groove bottom. However, due to the fact that such rings deform ovally when spread or compressed, it is inherent in their construction that while fitting against the groove bottom they do not exert any substantial pressure thereagainst and hence can be easily turned in the groove relative to the shaft or housing, this being a recognized feature of disadvantage of ordinary retaining rings of uniform section height.

According to a second known type of spring retaining ring, the ring is tapered so that the section heights thereof decrease progressively from its mid section to its free ends, the taper being calculated so that the ring maintains its circularity under deformation, i. e. when spread or compressed. Such rings can be dimensioned so that when sprung into their grooves they fit tightly around the bottom of the groove with a remarkably high pressure, so that they have a pressure fit against the groove bottom and not the turning fit characterizing the ordinary spring ring of uniform section height.

However, both of the stated types of rings are open to the objection that they do not locate exactly the machine part relative to shaft or housing because of the necessary tolerances in the length of the machine part itself, in the thickness of the retaining rings themselves, and, last but not least, in the location of the groove in the shaft or housing. Accordingly, the use of both types of rings results in end play between the holding face of the ring and the corresponding abutting surface of the machine part to be held, which can amount to the sum total of the tolerances enumerated above.

In attempts to overcome this end play as aforesaid, ordinary spring rings, i. e. rings of uniform section height throughout, were formed or otherwise provided with a keystone or wedge section, and the groove wall was correspondingly inclined so that the ring in effect formed a wedge fitting into the space between the tapered groove wall and the abutting face of the machine part. In this manner it was theoretically possible to obtain a pressure fit of the ring in its groove and thus prevent objectionable end play of the machine part.

But, as already stated, the ordinary ring of uniform section height throughout its periphery, if spread or compressed from a fixed inner or outer diameter corresponding to that of the groove bottom deforms to oval shape rather than maintaining its circularity, with the result that such a ring when pressure fitted into its groove as aforesaid was found to have unequal and uncertain bearing against the inclined groove wall throughout its periphery, resulting in a decrease in the friction hold of the ring in its groove, and also endangering the groove wall along the regions or points thereof engaged by the ring consequent to the relatively high pressures resulting from the wedging action. Moreover, due to the fact that the groove for such rings is provided in relatively softer metals than the high-grade spring steel from which the ring itself is made, the danger of deteriorating the groove wall by such pressures as are exerted unequally thereon by the harder ring is so considerable as to render such a securing means unreliable and unsatisfactory in operation.

However, none of the above objections or unreliable securing action characterizes the use of a pressure fitted ring of progressively decreasing section height, because such a ring maintains its circularity at any of the various effective diameters to which it is spread or compressed and hence its effective diameter is not fixed by the diameter of the groove bottom. Accordingly, a principal object of the invention is the provision of a retaining ring assembly of simple and dependable construction employing a pressure fitted retaining ring of progressively decreasing section height for locating a machine part axially relative to a shaft or housing carrying the same while at the same time effectively securing the part against end play.

Another important object of the invention is the provision of a retaining ring assembly capable of securing a machine part against axial end play relative to a shaft or housing carrying the same, while at the same time permitting the necessary tolerances in the dimensioning of the machine part, the thickness of the retaining ring employed as the securing means, and in the placement of the shaft or housing groove. A further object is the provision of a retaining ring assembly incorporating a retaining ring so constructed as to be pressure fitted throughout its full circumference into the space between a wall of the groove in which it seats and an abutting surface of the machine part to be held. A further object of the invention is the provision of a spring retaining ring providing an annular wedge which maintains its circularity under deformation and which accordingly may be assembled again and again without impairment of the ring or deterioration of the groove in which it fits.

Other objects will be in part obvious and in part hereinafter pointed out in connection with the following analysis of the invention wherein two forms of the invention have been illustrated.

In the drawings—

Figure 1:
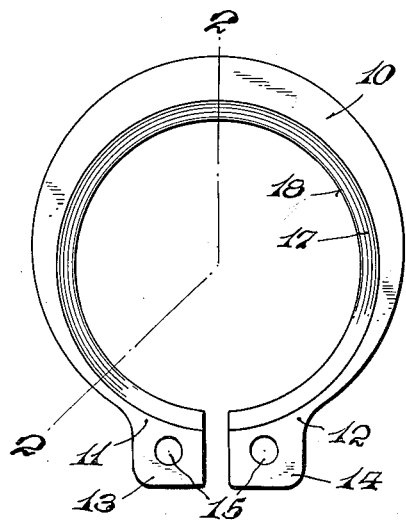
Fig. 1 is a plan view of a so-called external retaining ring according to the invention.

In the drawings wherein like reference characters designate like parts throughout the several views, reference character 10, Fig. 1, designates a so-called external retaining ring adapted to be sprung into an outwardly opening groove of a shaft, for example, and which comprises an open-ended ring constructed from spring material such as spring steel, the section heights of which progressively decrease from its middle section to its free ends 11 and 12. The said ends are provided with outwardly projecting lugs or ears 13, 14, which as shown are each provided with an aperture 15 for receiving the points of a tool operating to spread the ring whereby it may be slipped over the end of a shaft and thereupon sprung into a shaft groove. It will be understood that due to its taper, i. e. progressively decreasing section heights, the ring as illustrated maintains its circularity under deformation.

According to the invention, the ring 10 is formed or otherwise provided with an inclined or beveled surface 17 along and concentric with the inner circular edge 18 of the ring, the inclined surface forming with the opposite plane face of the ring an annular wedge extending along the full periphery of the inner ring edge. It is thus inherent in the ring that as it is deformed, i. e. spread or compressed, its annular wedge portion, like the inner circular edge 18 of the ring, maintains true circularity.

Figure 2:
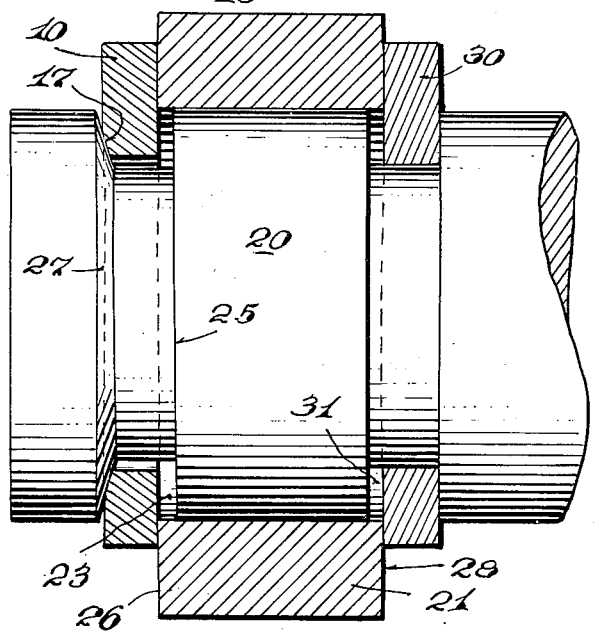
Fig. 2 is a section through a typical retaining ring assembly incorporating a retaining ring as shown in Fig. 1, taken along a section line corresponding to the line 2—2 of Fig. 1.

Referring to Fig. 2 illustrating a typical retaining ring assembly according to the invention, reference character 20 designates a shaft on which a machine part 21, which may be a gear, bearing race, pulley or the like, is to be secured against axial displacement. A groove 23 is formed in the shaft, and the machine part may be located relative to the groove so that the relatively inner wall 25 of the groove is overhung by the plane end face 26 conventionally provided at one end of the machine part 21 to be held, the end face 26 thus providing an abutting surface against which the plane surface of the ring may bear. The other or outer side wall 27 of the groove 23 is inclined to the vertical by exactly the same angle that the inclined surface 17 of the ring bears to the plane of the ring proper, thus to form a cone surface which is complementary to the inclined ring surface 17. Accordingly, as the ring 10 is pressure fitted into the groove 23, its inclined surface 17 bears against the inclined wall 27 of the groove and due to the property of the ring and hence the annular wedge portion thereof in maintaining circularity under deformation, the ring bears against the inclined groove wall throughout its full periphery.

To insure pressure fit of the ring in its groove, the ring 10 and groove 23 are both dimensioned as to thickness and width, respectively, and also as to diameters, so that the ring has tight fit between the overhanging surface 26 of the machine part 21 and the inclined wall 27 of the shaft groove 23, and so that the inner ring edge 18 has clearance relative to the groove bottom. The fitted ring is thus maintained through the pressure engagement of the inclined surfaces 17, 27 at a diameter greater than its normal or unstressed diameter, and hence the tendency of the ring to return to normal diameter exerts a certain force which acts through its radial component to self-lock the ring in its groove and through its horizontal component to pressure fit the ring into the groove space between inclined groove wall and machine part, thus to positively locate and secure the latter against end play. This force may be varied for a particular condition or particular type of machine part by change in the degree of deformation of the ring required to seat the ring as aforesaid, but will always be such as to insure self locking of the ring in its groove.

The opposite end surface 28 of the machine part can be located against a shoulder formed on the shaft, for example, a shoulder formed by a retaining ring 30 which is sprung into a shaft groove 31 adjacent the other end of the machine part, the ring having plane parallel faces as shown.

Figure 3:
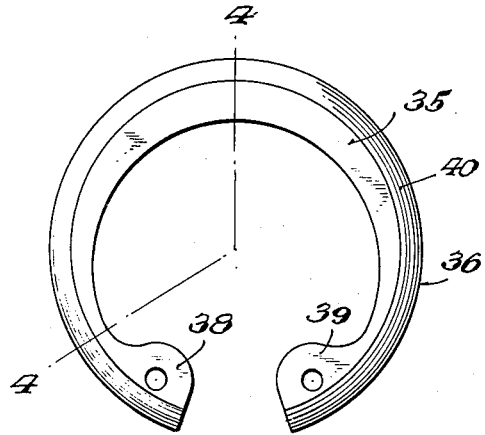
Fig. 3 is a plan view of an internal retaining ring according to the invention.

The internal ring 35 shown in Fig. 3 differs from the ring 10 in that the outer circular edge 36 thereof is adapted to seat in an inwardly opening groove of a machine housing, for example. Like the ring 10, the ring 35 is characterized by section heights which progressively decrease from the mid portion of the ring to its end portions, the latter being provided with inwardly directed, apertured ears 38, 39. Along its outer circular edge 36 and concentric therewith, the ring is provided with an inclined surface 40 corresponding to the surface 17 of the Fig. 1 ring, thus to provide an outer annular wedge which maintains its circularity when the ring is compressed or spread.

Figure 4:
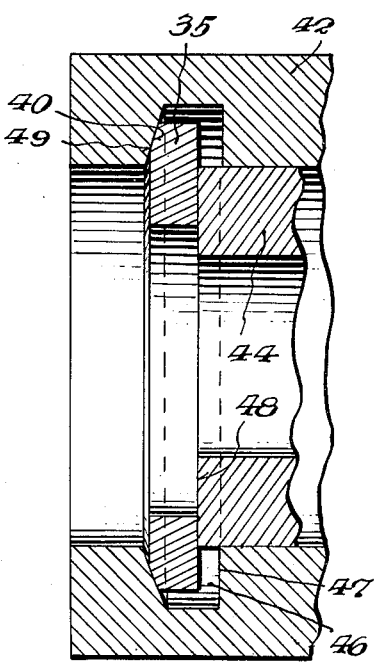
Fig. 4 is a section through a typical retaining ring assembly employing a ring as shown in Fig. 3 and taken on a section line corresponding to line 4—4 of Fig. 3.

In Fig. 4, illustrating a typical retaining ring assembly employing an internal ring as shown in Fig. 3, reference character 42 designates a housing relative to which the machine part 44 is secured against axial displacement by the illustrated ring 35 which seats in an inwardly opening housing groove 46. The relatively inner wall 47 of the housing groove is overhung by the plane end face 48 of the machine part, and its other wall 49 is inclined to have the same angle of inclination as the inclined surface 40 of the ring. Thus, as the ring 35 is compressed to insert the same into the housing bore, and thereupon sprung into the groove 46, it functions as a spring wedge having pressure fit throughout its full periphery in the space between the plane end wall of the machine part and the inclined wall 49 of the groove. As shown, the thickness and diameter of the ring and the width of the groove 46 are so dimensioned that the fitted ring is stressed (compressed) to a diameter less than its normal or unstressed diameter to which it tends to spread. Thus the ring locks itself into the groove, and also exerts through the inclination of the surfaces 40, 49 a substantial side pressure serving to preclude end play of the machine part 44.

Thus, according to the invention, a precision fit of a machine part can be provided by the simple expedient of springing an open-ended retaining ring having progressively decreasing section height and formed as an annular wedge into a shaft or housing groove provided with an appropriately inclined abutting wall, of the type which could be achieved hitherto only by screwlike adjusting means.

The tapering of the ring groove can be performed with a profile cutter in known manner, and the tapering or inclining of the face of the ring adjacent either edge thereof, thus to form it into an annular wedge, can be produced, for example by holding the ring in an appropriate fixture and grinding it in a surface grinder. In simple cases it may be necessary only to taper the ring surface, and in other simple cases, particularly where small rings are used and the thrust load is not too high, it is possible also to use a ring of uniform thickness throughout in conjunction with an inclined groove wall, the contact in both cases being in the nature of circular line contact of relatively small radius.

Accordingly, as many changes could be made in carrying out the above construction without departing from the scope of the invention, it is intended that all matter contained in the above description or shown in the accompanying drawings shall be interpreted as illustrative and not in a limiting sense.

We claim:

1. A retaining ring adapted to be sprung into the groove of a shaft, housing and the like and to form an artificial shoulder capable of securing a machine part against axial displacement relative thereto comprising an open-ended spring ring, the section heights of which progressively diminish from its middle section to its free ends, whereby the ring maintains circularity under deformation, one face of the ring having a surface which is uniformly inclined with respect to the opposite face and which extends along and for the full arcuate length of the groove-seating edge of the ring whereby said ring functions as an annular wedge when seated in its groove, the free ends of the ring having ears projecting from the shoulder forming edge thereof and being apertured to receive the working points of a ring-handling tool.

2. A retaining ring as set forth in claim 1, wherein the uniformly inclined surface extends along the inner circular edge of the ring, and said ears project from the outer edge thereof.

3. A retaining ring as set forth in claim 1, wherein the uniformly inclined surface extends along the outer circular edge of the ring, and said ears project from the inner edge thereof.

4. A retaining ring assembly comprising the combination of a machine part located on and secured against axial displacement relative to another part such as a shaft, housing and the like, said other part being provided with a groove, said machine part having an end face overhanging one wall of the groove, the other wall of the groove being inclined, and a retaining ring seated in the groove and engaging against the end face of the machine part and the inclined wall of the groove, the ring being of open-ended construction and having diminishing section height from its mid portion to the open ends thereof and being provided in one of its faces and along its circular edge adjacent the bottom of the groove with a uniformly inclined surface disposed to bear against the inclined wall of the groove.

5. A retaining ring assembly as set forth in claim 4, wherein said other part is in the nature of a shaft and the groove therein opens outwardly thereof, and wherein the inclined surface of the ring is formed along the inner circular edge thereof.

6. A retaining ring assembly as set forth in claim 4, wherein the said other part comprises a housing with the groove therein opening inwardly thereof and wherein the inclined surface of the ring is formed along the outer circular edge thereof.

LUDWIG S. BLUTH.
RUDOLF FEITL.

REFERENCES CITED

The following references are of record in the file of this patent:

UNITED STATES PATENTS

| Number | Name | Date |
|---|---|---|
| 1,758,515 | Heiermann | May 13, 1930 |
| 2,131,948 | Graham | Oct. 4, 1938 |

FOREIGN PATENTS

| Number | Country | Date |
|---|---|---|
| 62,629 | Denmark | Aug. 28, 1944 |
| 278,564 | Great Britain | Oct. 13, 1921 |
| 496,107 | Great Britain | Nov. 24, 1938 |
| 540,229 | Germany | Jan. 29, 1931 |